United States Patent [19]

Tam

[11] Patent Number: 5,341,460
[45] Date of Patent: Aug. 23, 1994

[54] METHOD AND APPARATUS FOR PRODUCING A THREE-DIMENSIONAL COMPUTERIZED TOMOGRAPHY IMAGE OF AN OBJECT WITH IMPROVED CONVERSION OF CONE BEAM DATA TO RADON DATA

[75] Inventor: Kwok C. Tam, Schenectady, N.Y.
[73] Assignee: General Electric Company, Schenectady, N.Y.
[21] Appl. No.: 119,803
[22] Filed: Sep. 13, 1993

Related U.S. Application Data

[63] Continuation of Ser. No. 936,497, Aug. 28, 1992, abandoned.
[51] Int. Cl.$^5$ ............................................. G06F 15/64
[52] U.S. Cl. .............................. 395/119; 364/413.13; 364/413.14; 364/413.15; 378/5; 378/901; 395/133
[58] Field of Search ............... 395/119, 124, 125, 126, 395/132, 133, 161; 364/413.13, 413.14, 413.15; 378/5, 901

[56] References Cited

U.S. PATENT DOCUMENTS 4,506,327 3/1985 Tam .................................. 364/414
4,866,614 9/1989 Tam .
5,177,776 1/1993 Ohmori et al. ............. 364/413.14 X

OTHER PUBLICATIONS

"Convolutional Reconstruction from Cone-Beam Projection Data", Gerald N. Minerbo, IEEE Trans. Nucl. Sci., vol. NS-26, No. 2, pp. 2682-2684, Apr. 1979.
"Practical Cone-Beam Algorithm", L. A. Feldkamp, L. C. Davis, and J. W. Kress, J. Opt. Soc. Am. A., vol. 1, No. 6, pp. 612-619, Jun. 1984.
"Image Reconstruction from Cone-Beam Projections: Necessary and Sufficient Conditions and Reconstruction Methods", Brude D. Smith, IEEE Trans. Med. Imag., vol. MI-44, p. 1425, Mar. 1985.
"Analysis of A 3D Imaging System by Reconstruction of X Radiographies in Conical Geometry" (Analyse d'un System D–Imagerie 3D par Reconstruction a partir de Radiographies X en Geometrie conique), P. Grangeat, Ph.D. Thesis, National College of Telecommunciations (I–Ecole Nationale Superieure des Telecommunications), France 1987.
"Tomographical Imaging with Limited–Angle Input", K. C. Tam an V. Perez-Mendez, J. Opt. Soc. Am/vol. 71, No. 5, May 1981, pp. 582–592.
"Comparison of 3-D Tomographic Algorithms for Vascular Reconstruction", A. Rougee, K. M. Hanson, and D. Saint-Felix, SPEI vol. 914, Medical Imaging II, 1988, pp. 397–405.
"Quantitative Cone-Beam Reconstruction", Hui Hu, Robert A. Kruger, and Grant T. Gullberg, SPIE vol. 1092, Medical Imaging III: Image Processing, 1989, pp. 492–501.
"ART: Mathematics and Applications-A Report on the Mathematical Foundations and on the Applicability to Real Data of the Algebraic Reconstruction Techniques", Gabor T. Herman, Arnold Lent, and Stuart Rowland, Jounral of Theoretical Biolog, 1973 42, pp. 1–31.
"An Inversion Formula for Cone-Beam Reconstruction", Heang K. Tuy, Siam J. Appl. Math, vol. 43, No. 3, Jun. 1983, pp. 546–552.
"Iterative Three-Dimensional Reconstruction From Twin–Cone Beam Projections", M. Schlindwein, IEEE Transactions on Nuclear Science, vol. NS-25, No. 5, Oct. 1978, pp. 1135–1143.
"Practical Cone-Beam Algorithm", L. A. Feldkamp, L. C. Davis and J. W. Kress, J. Opt. Soc. Am. A/vol. 1, No. 6, Jun. 1984, pp. 612–619.

*Primary Examiner*—Heather R. Herndon
*Assistant Examiner*—Almis Jankus
*Attorney, Agent, or Firm*—Enrique J. Mora; Paul R. Webb, II

[57] ABSTRACT

Cone beam geometry imaging uses an area or two-dimensional array detector and a cone beam x-ray source. Image reconstruction by inverse Radon transformation is used following the calculation of planar integrals. Specifically, the integral is calculated by first changing it to a form wherein fast Fourier transforms can be used to minimize the number of operations in the calculations of the integral.

18 Claims, 5 Drawing Sheets

METHOD AND APPARATUS FOR PRODUCING A THREE-DIMENSIONAL COMPUTERIZED TOMOGRAPHY IMAGE OF AN OBJECT WITH IMPROVED CONVERSION OF CONE BEAM DATA TO RADON DATA

This application is a continuation of application Ser. No. 07/936,497, filed Aug. 28, 1992 now abandoned.

BACKGROUND OF THE INVENTION

This invention relates to imaging. More specifically, this invention relates to three dimensional computerized tomography providing for fast conversion of cone beam data to radon data.

In conventional computerized tomography for both medical and industrial applications, an x-ray fan beam and a linear array detector are employed. Two-dimensional (2D) imaging is achieved. While the data set is complete and image quality is correspondingly high, only a single slice of an object is imaged at a time. When a three-dimensional (3D) image is required, a "stack of slices" approach is employed. Acquiring a 3D data set a 2D slice at a time is inherently tedious and time-consuming. Moreover, in medical applications, motion artifacts occur because adjacent slices are not imaged simultaneously. Also, dose utilization is less than optimal because the distance between slices is typically less than the x-ray collimator aperture, resulting in double exposure to many parts of the body.

A more recent approach, based on what it called cone beam geometry, employs a two-dimensional array detector (often called an area detector) instead of a linear array detector, and a cone beam x-ray source instead of a fan beam x-ray source. At any instant, the entire object is irradiated by a cone beam x-ray source, and therefore cone beam scanning is much faster than slice-/by/slice scanning using a fan beam or a parallel beam. Also, since each point in the object is viewed by the x-rays in 3D rather than in 2D, much higher contrast can be achieved than is possible with conventional 2D x-ray computerized tomography (CT). To acquire cone beam projection data, an object is scanned, preferably over a 360° angular range. The scanning may be accomplished by moving the x-ray source in an appropriate scanning trajectory such as a circular trajectory around the object, while keeping the 2D array detector fixed with reference to the source. Alternately, the object may be rotated while the source and detector remain stationary. In either case, it is relative movement between the source and object which effects scanning.

Most image reconstruction procedures in x-ray CT are based on the Radon inversion process, in which the image of an object is reconstructed from the totality of the Radon transform of the object. The radon transform of a 3D object consists of planar integrals. The cone beam data, however, are not directly compatible with image reconstruction through inverse radon transformation, which requires the use of planar integrals of the object as input. Consequently, image reconstruction by inversion from cone beam scanning data generally comprises two steps. A first step is to convert the cone beam data to planar integrals. A second step is then to perform an inverse Radon transform on the planar integrals to obtain the image.

The first step is described by the present inventor's prior application Ser. No. 07/631,815, filed Dec. 21, 1990, entitled "METHOD AND APPARATUS FOR CONVERTING CONE BEAM X-RAY PROJECTION DATA TO PLANAR INTEGRALS AND RECONSTRUCTING A THREE-DIMENSIONAL COMPUTERIZED TOMOGRAPHY (CT) IMAGE OF AN OBJECT", assigned to the assignee of the present application and hereby incorporated by reference. A technique for performing an inverse Radon transform on planar integrals to obtain an image is described in the present inventor's prior U.S. patent application Ser. No. 07/631,818, filed Dec. 21, 1990, entitled "PARALLEL PROCESSING METHOD AND APPARATUS FOR RECONSTRUCTING A THREE-DIMENSIONAL COMPUTERIZED TOMOGRAPHY (CT) IMAGE OF AN OBJECT FROM CONE BEAM PROJECTION DATA OR FROM PLANAR INTEGRALS", assigned to the assignee of the present application, and hereby incorporated by reference. Thus, those two prior incorporated by reference U.S. patent applications describe techniques which may be used for three-dimensional image reconstruction by inversion from cone beam scanning data.

Further image reconstruction techniques are disclosed in the present inventor's prior U. S. patent application Ser. No. 07/631,514, filed Dec. 21, 1990, entitled "METHOD AND APPARATUS FOR RECONSTRUCTING A THREE-DIMENSIONAL COMPUTERIZED TOMOGRAPHY (CT) IMAGE OF AN OBJECT FROM INCOMPLETE CONE BEAM PROJECTION DATA", assigned to the assignee of the present application, and hereby incorporated by reference.

One method for converting cone beam data to planar integrals is disclosed in Gerald N. Minerbo, "Convolutional Reconstruction from Cone-Beam Projection Data", IEEE Trans. Nucl. Sci. , Vol. NS-26, No. 2, pp. 2682–2684 (April 1979). Unfortunately, as is discussed, for example, in L. A. Fledkamp, L. C. Davis, and J. W. Kress, "Practical Cone-Beam Algorithm", J. Opt. Soc. Am. A. , Vol. 1, No. 6, pp. 612–619 (June 1984) , the derivation in Minerbo contains an error which cannot easily be rectified and which renders the result invalid.

In Bruce D. Smith, "Image Reconstruction from Cone-Beam Projections: Necessary and Sufficient Conditions and Reconstruction Methods", IEEE Trans. Med. Imag., Vol. MI-44, pp. 1425 (March 1985), there is disclosed a method for converting from cone beam data the one-dimensional convolution of the planar integrals with the Horn's kernel. Since the convolution mixes together the planar integrals on all the planes, the computation of one point of the convolved result requires all the data on the detector at one view angle. Thus the task is very computationally intensive.

In P. Grangeat, "Analysis of A 3D Imaging System by Reconstruction from X Radiographies in Conical Geometry" ("Analyse d'un System D-Imagerie 3D par Reconstruction a par-tir de Radiographies X en Geometrie conique"), Ph.D. Thesis, National College of Telecommunications (I-Ecole Nationale Superieur des Telecommunications), France (1987), a technique is disclosed for computing the derivative of the planar integrals from cone beam data. The computed data points, however, reside on a set of great circles on a spherical shell in Radon space. These great circles in general do not fall on any arbitrary set of planes in Radon spaces, and do not fall on a set of coaxial vertical planes in Radon space. Thus they are not suitable for input to inverse Radon transformation. It would require an extensive effort in three-dimensional interpolation to get the data on the vertical planes to be used in inverse Radon transformation, and furthermore interpolation would introduce errors into the data.

Although the present inventor's prior U.S. application Ser. No. 07/631,815 describes a technique for converting the cone beam data to planar integrals (so that an inverse Radon transform may be performed on the planar integrals to obtain the image), the technique requires approximately $N^4$ operations to be performed where $N^3$ is the number of Radon points. Specifically, a line integral is calculated for each of the Radon points and the computation of that line integral for each Radon point involves approximately N operations. Although this technique is generally satisfactory, the large number of operations are time consuming. A relatively large amount of processing capacity may be required in order to perform the large number of operations sufficiently quickly to produce real time three-dimensional images.

SUMMARY OF THE INVENTION

Accordingly, it is an object of the present invention to provide a new and improved imaging technique. A more specific object of the present invention is to provide a method and apparatus for efficiently converting cone beam data to Radon data to allow 3D image reconstruction through inverse Radon transformation.

Yet another object of the present invention is to provide imaging with conversion of cone beam data to Radon data with a reduction in the processing capacity or power required.

A still further object of the present invention is to provide imaging with faster conversion of cone beam data to Radon data.

The method of imaging according to the present invention includes applying cone beam energy, dependent upon an object of interest, to an area detector. A cone beam data image X(ij) based upon the energy detected at points (ij) on the area detector is then detected. Each of the points (ij) has a corresponding detector element on the area detector. The method further includes determining the value of line integral J on the detector where $$J = \int \frac{|SC|X(t)}{(t - \Delta C)\sqrt{|SC|^2 + t^2}} dt$$

and where X(t) is cone beam data image at point t along a line of integration, SC' is the distance from a source S of cone beam energy to a rotation center C' on the detector, SC is the distance from the source S to the point C on the line of integration which is closest to the origin, and $\Delta C$ is the displacement of C' from C.

Most significantly, the value of the line integral J is efficiently determined by the following substeps:

calculating a modified image F(i,j)=X(i,j)/R(i,j) where R(i,j) is the distance from source S to point (i,j) on the area detector;

calculating a 2D Fourier transform g(m,n) in (m,n) space using a fast Fourier transform and dependent on F(i,j);

interpolating from g(m,n) a line of Fourier components $g_\alpha(k)$ where $\alpha$ is a desired projection angle, k are inputs to $g_\alpha$ along the line of Fourier components passing through an origin in (m,n) space and oriented perpendicular to the desired projection angle;

performing a 1D fast Fourier transform on to obtain $p_\alpha(l)$;

obtaining $p_\alpha(S)$ by 1D interpolation from $p_\alpha(l)$ where $p_\alpha(s)$ is a line integral on a particular line at a location s in the desired projection angle $\alpha$.

The method uses $p_\alpha(s)$ to reconstruct 3D image of the object using the Radon inversion process. The reconstructed image of the object is then displayed.

The method may further include the steps of repeating the interpolating of g(m,n) through the obtaining of $p_\alpha(s)$ for various values of $\alpha$. The steps of interpolating from g(m,n) and performing the one dimensional fast Fourier transform take into account at least for all points in Radon space which are on or within the object. Relative movement of the source and the object is caused and the steps of detecting the cone beam data image and determining the value of line integral J are repeated for different relative positions of the source. (The movement of the source relative to the object may be accomplished by moving the source and holding the object stationary or by holding the source stationary and moving the object.) The beam energy is x-ray radiation from the source.

The function g(m,n) is calculated by calculating G(i,j)=F(i,j)/y'(i,j) where y'(i,j) is the y displacement of the point (i,j) from C' and taking the 2D fast Fourier transform of G(i,j), g(m,n) being the Fourier transform of G(i,y). The function $p_\alpha(l)$ is the one-dimensional projection of G(i,j) in the desired projection angle $\alpha$. The system according to the present invention is an imaging system including a source of cone beam energy. An area detector for detecting cone beam energy from the source provides cone beam data image X(i,j) of an object of interest. A processor is operably connected to receive the image X(i,j) from the area detector. The processor has means for determining the value of line integral j in the manner described above. A display is operably connected to the processor to display the reconstructed image of the object.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
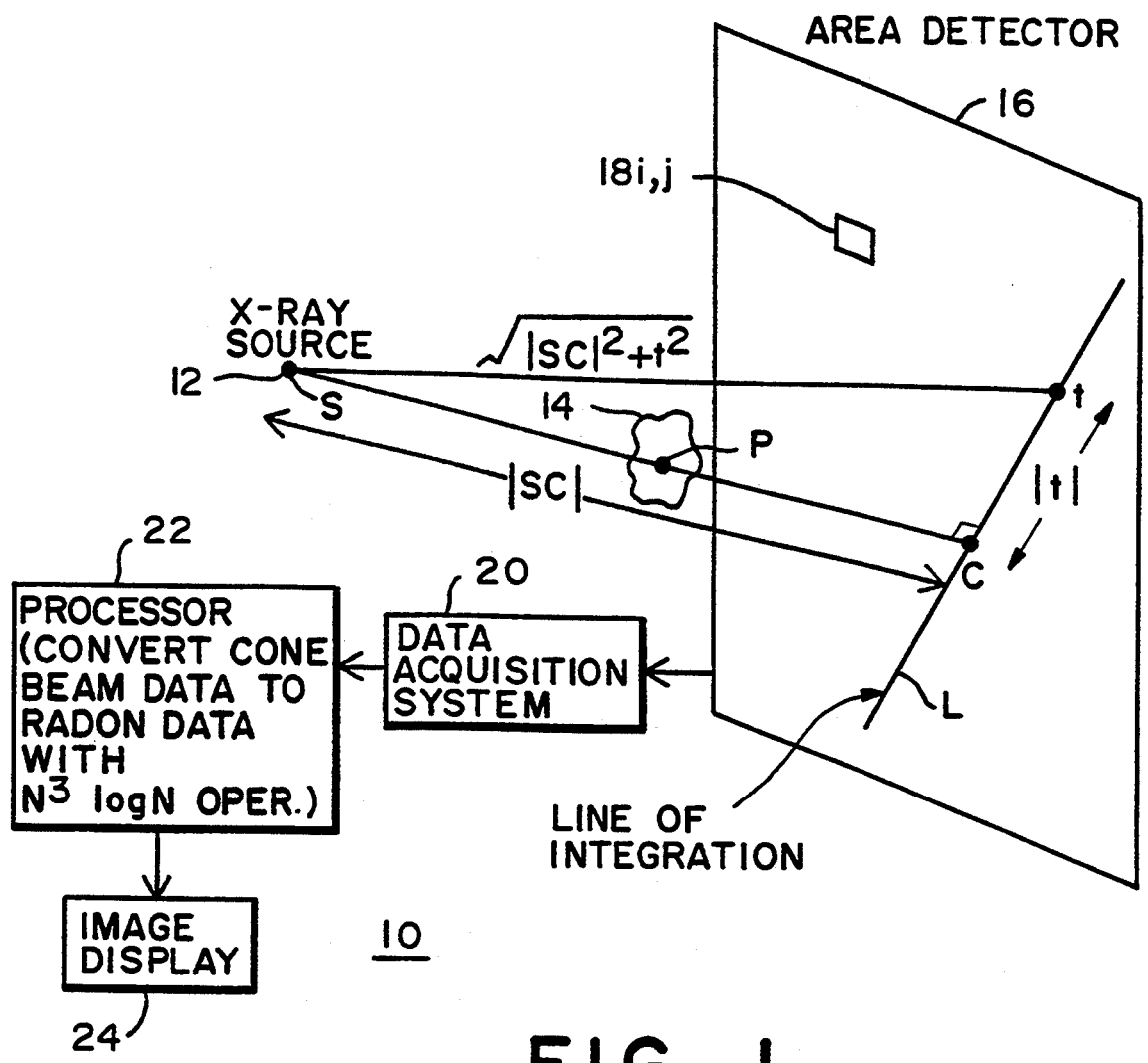
FIG. 1 shows a schematic illustrating a principle of operation of the present invention and combined with a simplified block diagram of the system of the present invention.

Referring initially to FIG. 1, the system 10 of the present invention uses a point source 12 (also labeled S) to apply a conical beam x-ray to an object 14 for which a 3D image is required. Conical beam data is generated by a two dimensional or area detector 16. Although not shown in FIG. 1, the x-ray source 12 would be moved in an appropriate scanning trajectory and the area detector 16 would be fixed relative to the source 12. Alternately, source 12 and detector 16 would remain stationary while the object 14 is rotated. Various scanning techniques are described in the above incorporated by reference applications and are described in other sources. Accordingly, the specific scanning strategies need not be described in detail herein.

The area detector 16 could be constructed in known fashion with a plurality of rows and columns of detecting elements. For ease of illustration, FIG. 1 simply shows a single detecting element 18ij where i and j respectively represent the column and row of a particular detecting element.

During operation, x-ray photons that penetrate the object 14 are detected by the area detector 16 and are registered by the data acquisition system 20 which is connected to the detector 16. The photon counts, after being normalized by the air signals and converted to the negative of the logarithms, represent line integrals through the object 14. The data acquisition system 20 may operate in known fashion and need not be described in detail.

Data from the data acquisition system 20 is supplied to a processor 22. The processor 22 converts cone beam data to Radon data in accord with the present invention and as will be discussed in detail below. Additionally, the processor 22 may perform the inverse Radon transformation portion of the 3D image reconstruction in accord with the present inventor's prior application Ser. No. 07/631,818, which application was incorporated by reference above.

The processor 22, which may be a microprocessor or computer, provides an output to an image display 24. The x-ray CT images may be viewed on the image display 24.

As described in the present inventor's prior U.S. patent application Ser. No. 07/631,815, a technique was disclosed allowing computation of Radon data from cone beam projection data in an exact manner. The most time consuming operation involved in that technique is the computation of the line integral J on the detector $$J = \int \frac{|SC'|X(t)}{(t - \Delta C)\sqrt{|SC|^2 + t^2}} dt \quad (1)$$

for each radon point, where X(t) is the cone beam datum at the point t on the line of integration, SC' is the distance from the source 12 to a rotation center C' on the detector, SC is the distance from the source S or 12 to the point C on the line of integration which is closest to the origin, and $\alpha C$ is the displacement of C' from C. Since there are approximately $N^3$ Radon points, and the computation of J for each Radon point involves approximately N operations, the total number of operations using the technique described in the present inventor's prior application Ser. No. 07/631,815 is approximately $N^4$.

The derivation of equation 1 above is described in greater detail in the incorporated by reference prior application Ser. No. 07/631,815 and, therefore, need not be discussed in detail herein. However, it will briefly be noted that the line of integration L in FIG. 1 represents the intersection between the plane of integration relative to point P of object 14 and the plane of the area detector 16. Equation 1 above is equation 8 in the incorporated by reference application Ser. No. 07/631,815.

From FIG. 1, it can be seen that the square root on the right hand side of equation 1 is the distance from the source S (also labeled 12) to the point t on the line of integration. Therefore, this quantity is independent of the choice of the integration line. An example may be useful. Assume that a particular point t is along the line L. The point t corresponds to a detector element 18ij where i=2 and j=3. The distance from that detector element to the source S or 12 is the same even if one is integrating along a line other than line L. Thus, one can calculate this square root quantity for each of the detector elements 18ij. The input cone beam projection image X(ij) can be preprocessed to incorporate the square root factor as follows $$F(i,j) = \frac{X(i,j)}{R(i,j)} \quad (2)$$

where R(ij) is the distance from the source S to the detector element at (ij). Equation 2 simply defines a new function which takes into account the fact that the square root is independent of the choice of the integration line.

This newly defined function F of equation 2 may be substituted into equation 1, the integral J now has the form $$J = |SC| \int \frac{F(t)}{(t - \Delta C)} dt \quad (3)$$

Note that function F is defined relative to t in the same fashion as it is defined relative to the rows and columns corresponding to i and j since each value of t corresponds to particular values of i and j or values in between the integral values of i and j.

Figure 2:
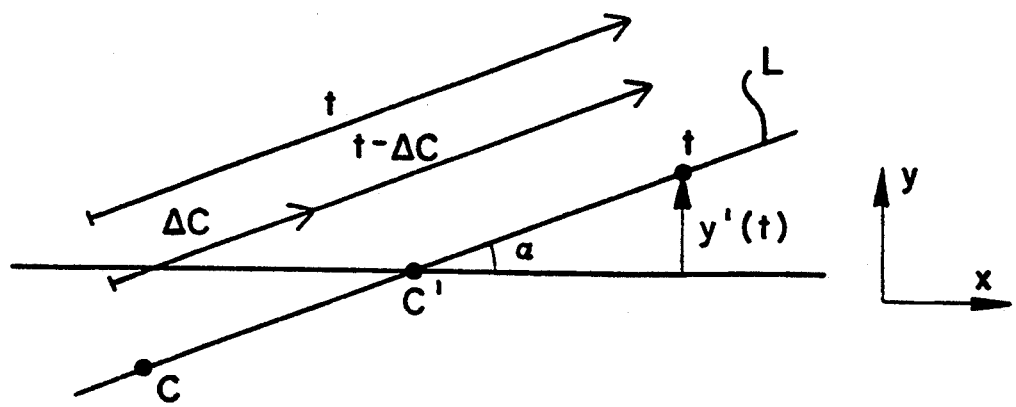
FIG. 2 is a planar view of the line of integration on the plane of the area detector.

From FIG. 2, it can be seen that $t - \Delta C$ is the displacement of t from the rotation center C'. Define y'(t) as the y displacement of the point t from C'. Let $\alpha$ be the angle made by the line of integration with the x axis. From the geometry of FIG. 2, it will be appreciated that $$t - \Delta C \frac{y'(t)}{\sin\alpha} \quad (4)$$

substituting equation 4 into equation 3 and considering that the sin of the angle can be moved outside the integral since it is not changeable as t changes, gives $$J = |SC|\sin\alpha \int \frac{F(t)}{y'(t)} dt \quad (5)$$

Figure 3:
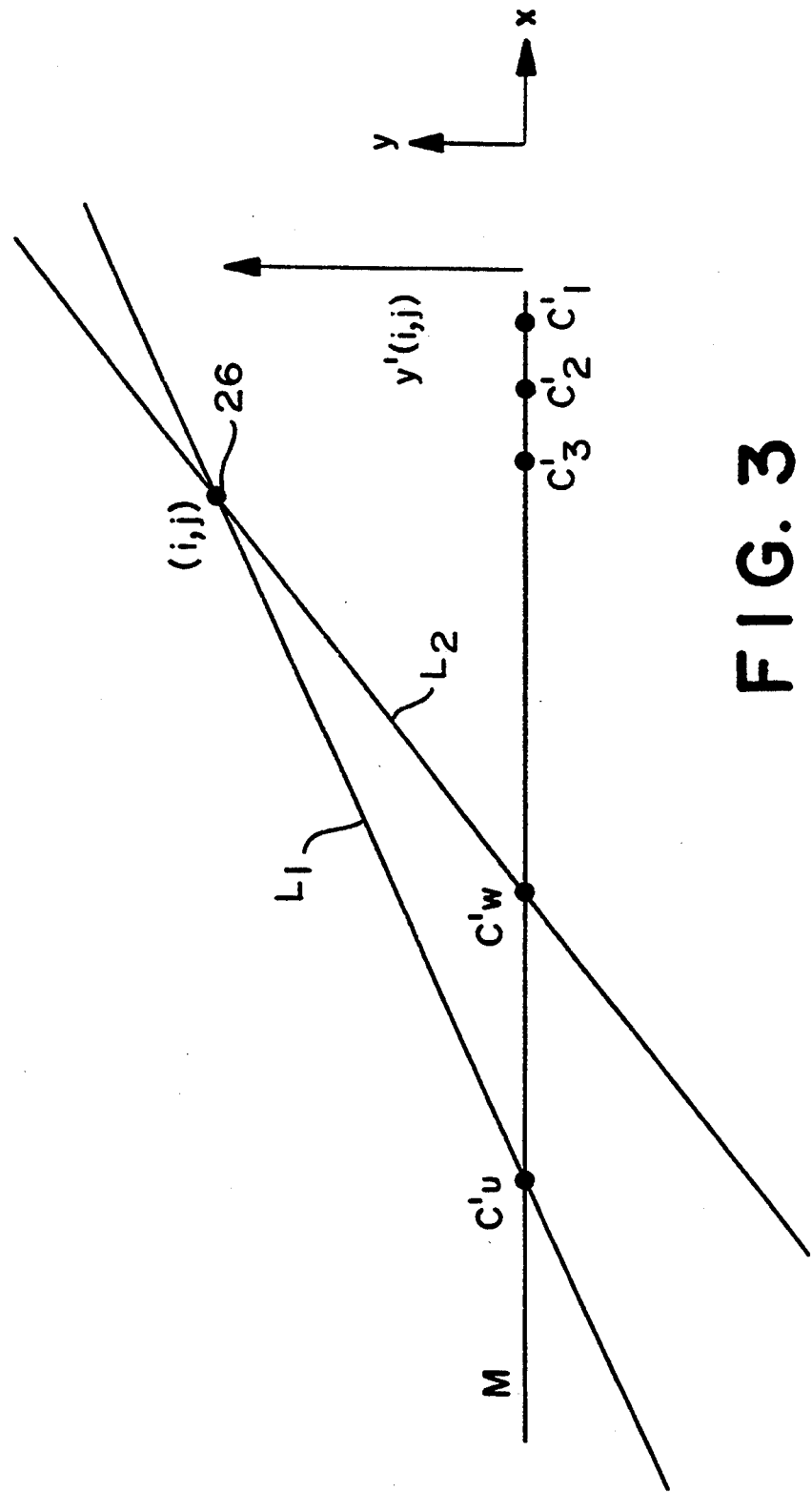
FIG. 3 is similar to FIG. 2 except that it shows two lines of integration and various rotation centers for different lines.

For one input cone beam projection image (i.e., the source 12 being at a particular position in its scan), choose all the rotation centers so that they lie on a line M parallel to the X axis as shown in FIG. 3. In this case, the y displacement y' of any point on the detector from a rotation center does not depend on the choice of the rotation center. In other words, the y' value for the point t on a line of integration does not depend on the line on which integration is being performed. For example, the value of y' at point 26 at FIG. 3 is the same whether one is performing the line integral along line $L_1$ or along the line $L_2$. The y displacement y' of point 26 from $C'_u$ is the same as the y displacement of point 26 from $C'_w$ where $C'_u$ and $C'_w$ are rotation centers of lines of integration $L_1$ and $L_2$ respectively. Note that the function y' is defined relative to i and j in the same fashion as it is defined relative to t. The line does not really have to be parallel to the X axis, as long as the coordinate axes are rotated so that the new X axis is parallel to the line M.

The modified image F(ij) may be preprocessed by dividing the value at each pixel or detector element by the y displacement y' of the pixel from the line M as follows:

$$G(i,j) = \frac{F(i,j)}{y'(i,j)} \qquad (6)$$

substituting equation 6 into equation 5, while also again converting from use of the discrete variables i and j as the range to the continuous variable t, the line integral is as follows:

$$J = |SC| \sin \alpha \int G(t) dt \qquad (7)$$

Before discussing how the integral of equation 7 may be computed very rapidly using the projection theorem, the manner in which this calculation is part of the overall process of the present invention will be discussed with reference to the simplified flowchart of FIG. 4. Initially, block 30 corresponds to the application of cone beam energy to the area detector. The cone beam energy is dependent upon the object of interest. With reference momentarily back to FIG. 1, an x-ray CT system uses a point x-ray source S or 12 supplying x-ray energy to area detector 16. The energy supplied to area detector 16 depends upon the characteristics of the object 14. More specifically, the ability of x-rays from source 12 to pass through the object 14 depends upon the density of the object (density in this case referring to the degree of opacity of the object to the x-rays).

Although the present application has emphasized the applicability of the present invention to x-ray CT, it should be emphasized that the present invention also has applicability to other imaging systems wherein cone beam data is generated. For example, single photon emission computerized tomography (SPECT) may advantageously utilize the present invention. When SPECT is used on a medical patient, a radioactive isotope is supplied to an organ of interest. An area detector is placed to receive and detect radiation from the organ of interest by way of a collimator which effectively allows the simulation of a point source. In that case, the cone beam energy applied to the area detector depends upon the density (meaning concentration of radioactive particles in a particular volume) of radiation in the object or organ of interest. The details of SPECT need not be discussed herein, but it will simply be noted that such imaging systems do apply cone beam energy to an area detector.

Following block 30, block 32 involves the detection of the cone beam data. Referring back momentarily to FIG. 1, the various detector elements $18_{ij}$ (only one shown) detect the x-ray or other energy and provide data which is acquired by the data acquisition system 20.

Following block 32, block 34 involves the calculation of the line integral for each point. Specifically, equation 7 will be implemented using techniques described in detail below. Advantageously, block 34 will, using the techniques of the present invention, more efficiently calculate the line integrals as compared to the techniques described in the present inventor's prior application Ser. No. 07/631,815.

Following block 34, block 36 uses the line integral to perform the inverse Radon transform. Block 36, like block 34, would be carried out by the processor 22 of FIG. 1. However, the details of block 36 are described in the incorporated by reference prior U.S. application Ser. No. 07/631,818.

Following block 36, block 38 displays the 3D image of the object and the details of that are described in the incorporated by reference application Ser. No. 07/631,818.

Figure 4:
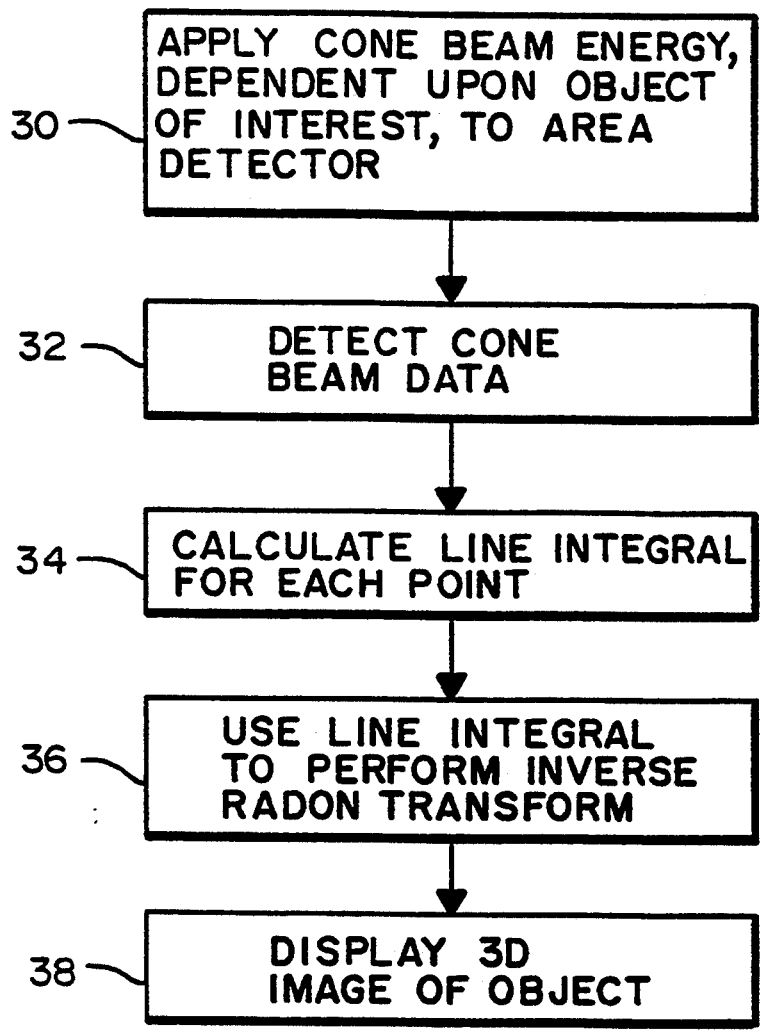
FIG. 4 is a simplified flow chart of the overall method according to the present invention.
Figure 5:
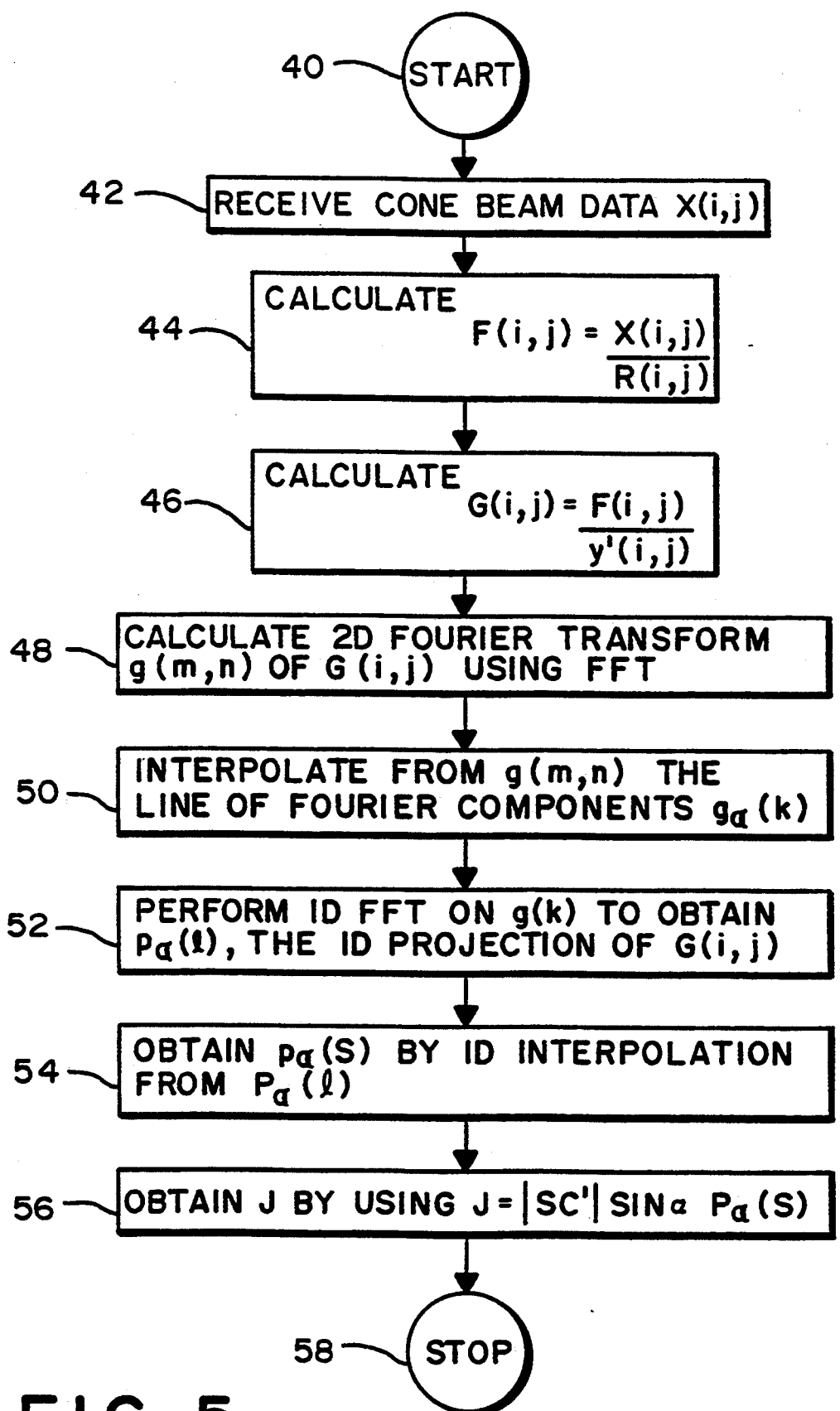
FIG. 5 is a simplified flowchart of an efficient method of calculating a line integral according to the present invention.

Turning now to FIG. 5, a simplified flow chart shows how the line integral is calculated corresponding to block 34 of FIG. 4. Following the start block 40 of FIG. 5, block 42 simply indicates that the processor 22 (refer back momentarily to FIG. 1) has received the cone beam data corresponding to the amount of x-ray or other energy received at each of the detectors $18_{ij}$. Next block 44 has the calculation of the function F based upon equation 2 above. Block 44 leads to block 46 whereat the function G is calculated based upon equation 6 above. The function may be considered as a preprocessed image in that the value of the image data has been modified based upon the distance R from the source to the detector element or pixel and has been modified based upon the displacement y' of the pixel from the line M (refer back momentarily to FIG. 3). Since the calculations of blocks 44 and 46 are performed relative to each of the detector elements 18ij (FIG. 1 only), this preprocessing of the image data avoids the need for performing these computations when one is taking a line integral upon a particular line such as line L of FIG. 1. Instead, one may simply then calculate the line integral of the preprocessed image function G.

Following block 46 of FIG. 5, block 48 is the initial step in use of the projection theorem for above. In discussing block 48 and the following blocks of FIG. 5, reference will also be made to FIG. 6 which graphically illustrates an application of the projection theorem. The projection theorem provides an efficient way of calculating a line integral in the form of the integral of G(t) of equation 7. The projection theorem could not be used for the integral of equation 1 of the present application as the integrand contains the factors $(t-\Delta C)$ and the square root. Since the particular line of integration and the location of the two points C and C' on the line affect the value of one or both of these factors, the integral of equation 1 is not in the form of a line integral through a function. Therefore, the projection theorem would not be useful for expediting the computation of equation 1 above. However, the projection theorem is applicable when the data has been modified to provide the line integral through a function corresponding to the integral of equation 7.

Figure 6:
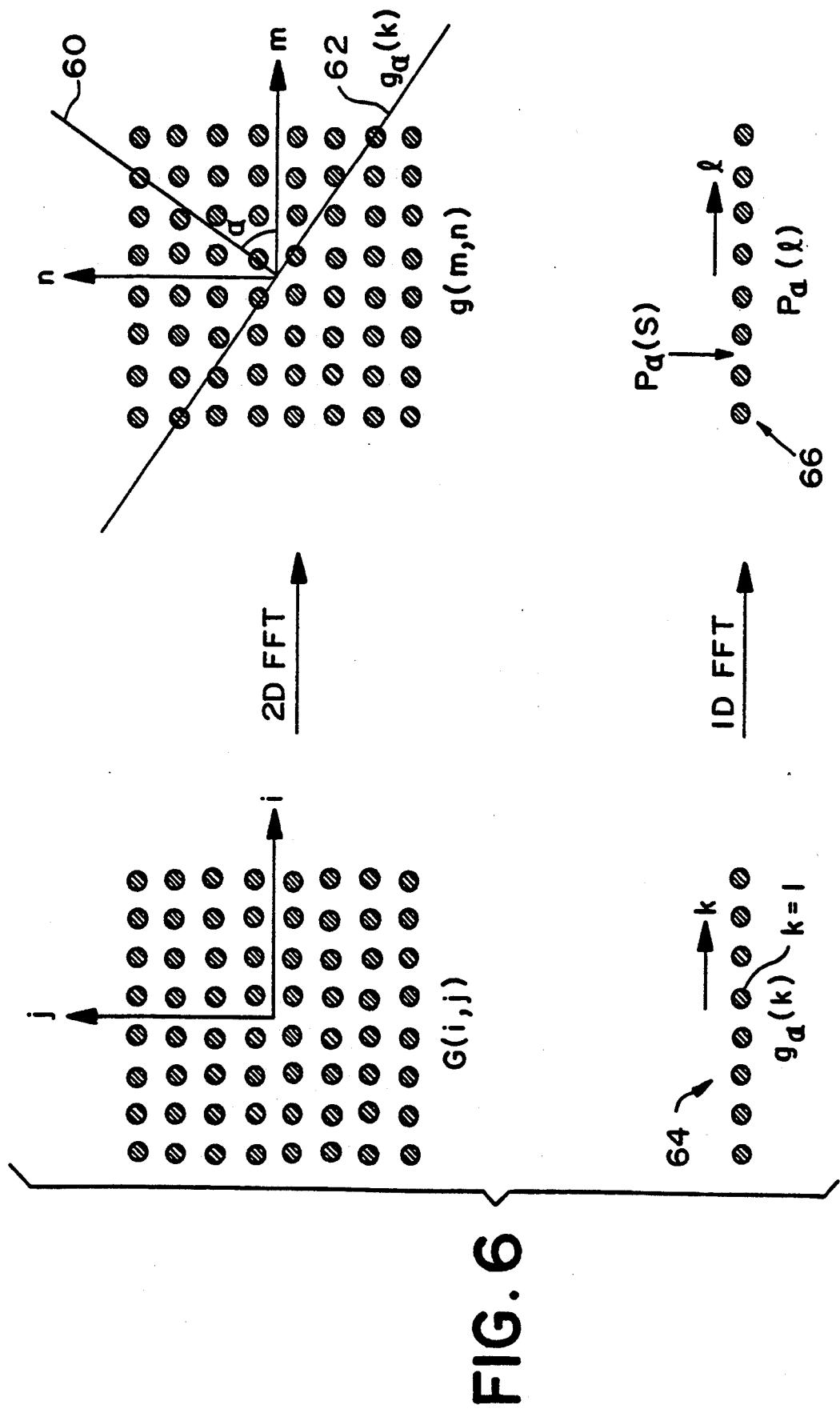
FIG. 6 is a graphic representation of various transformations used by the steps of FIG. 5.

Initially, block 48 of FIG. 5 calculates the two dimensional Fourier transform of function G(ij) using a two dimensional fast Fourier transform as illustrated in the conversion from ij at the left top of FIG. 6 to the m,n space at the top right of FIG. 6.

Following block 48, block 50 is the interpolation from g(m,n) of the line of Fourier components $g_\alpha(k)$ passing through the origin in the Fourier space oriented perpendicular to the desired projection angle $\alpha$. The process may calculate $g_\alpha(k)$ for $\alpha$ running every 1° from 0° to 360° and use interpolation for other values of $\alpha$. For example, the values for an $\alpha$ of 2.3° could be calculated by interpolation between 2° and 3°. With reference to the Fourier m,n space of FIG. 6, the desired projection angle corresponds to line 60, whereas the line of Fourier components is line 62 perpendicular to line 60. Block 50 involves calculating values for the function $g_\alpha(k)$ at a discrete series of points in the Fourier space. Where the line 62 intersects one of the dots in the Fourier space, the value of $g_\alpha(k)$ is identical to $g(m,n)$. However, the function $g_\alpha(k)$ is given a value for values of k which do not fall upon one of the m by n dots in the Fourier space by use of standard interpolation techniques.

The result of step 50 is the line of Fourier components 64. Using the same standard notation used in the other parts of FIG. 6, it should be appreciated that each dot represent a value corresponding to the function for the value of k corresponding to that dot. For example, the dot having a k value of one has been marked in the line 64 of Fourier components. Associated with the dot will be a value $g_\alpha(1)$.

Next, block 52 performs a one dimensional (1D) fast Fourier transform on the line of Fourier components to provide $p_\alpha(1)$, which is the one dimensional projection of $g(ij)$ in the desired projection angle $\alpha$. As shown in FIG. 6, this transforms the line 64 of Fourier components into line 66 of a function in 1 space.

Next, block 54 of FIG. 5 obtains values for $p_\alpha(s)$ by one dimensional interpolation from $p_\alpha(1)$. With reference to line 66 of FIG. 6, this interpolation Off step allows the calculation of the line integral $p_\alpha(s)$ on a particular line at a location s in the desired projection angle. If the location s is in between the location of the discrete values of 1, the interpolation allows the line integral to be determined.

From block 54, the processor 22 (FIG. 1 only) which has been performing the steps of FIG. 5, transfers control to block 56 which obtains the J of equation 1 by multiplying the result of block 54 by the indicated values. Following block 56, the calculations for the line integral may be stopped at block 58.

The flowchart of FIG. 5 is somewhat simplified in that the calculations will be performed for different locations of the source 12 (refer back to FIG. 1). In other words, the line integral of equation 1 will depend upon the relative position of the source 12 and the object 14 of FIG. 1. However, the calculation steps would simply be repeated for different locations of source 12. Further, it should be noted that blocks 50, 52, 54, and 56 would be repeated for different values of $\alpha$ depending upon the desired projection angle.

The two dimensional fast Fourier transform for each preprocessed image $G(ij)$ takes approximately logN operations. Since there are approximately N preprocessed images $G(ij)$ (from approximately N cone beam images $X(ij)$), the total number of operations is $N^3 \log N$, which is a significant reduction over the prior technique. Accordingly, the same amount of processing power can be used to more quickly perform these calculations. Alternately, reduced processing power or capacity could be used without increasing the time of calculations as compared to use of the prior technique involving $N^4$ operations.

The use of fast Fourier transform speeds up the conversion of cone beam data to Radon data by a large factor. The speeds up is achieved at the expense of two additional sources of errors. Specifically, the two dimensional interpolation in the Fourier space and the additional degree of two dimensional interpolation in the Radon space may introduce errors. The significance of these interpolation errors would depend upon the sampling density in the respective space.

Although the present invention has been described with reference to specific structures and techniques, it is to be understood that these are for illustrative purposes only. Various modification and adaptations will be apparent to those of skill in the art. Accordingly, the scope of the present invention should be determined by reference tot eh claims appended hereto.

What is claimed is:

1. A method of imaging comprising the steps of:
   (a) using a computed tomography cone beam source to apply cone beam energy, dependent upon an object of interest, to an area detector;
   (b) detecting the cone beam energy to define a cone beam data image $X(i,j)$ based upon the cone beam energy detected at points $(i,j)$ on the area detector, each point $(i,j)$ having a corresponding detector element;
   (c) determining the value of line integral J on the detector where $$J = \int \frac{|SC'|X(t)}{(t - \Delta C)\sqrt{|SC|^2 + t^2}} dt$$

and where $X(t)$ is cone beam data image at point t along a line of integration, $SC'$ is the distance from a source S of cone beam energy to a rotation center $C'$ on the detector, SC is the distance from the source S to a point C, wherein point C is the closest point to the origin on the line of integration and $\Delta C$ is the displacement of $C'$ from C, the value of J being determined by the substeps of:
   (c1) calculating a modified image $F(i,j)=X(i,j)/R(i,j)$ where $R(i,j)$ is the distance from source S to point $(i,j)$ on the area detector;
   (c2) calculating a two-dimensional Fourier transform $g(m,n)$ in $(m,n)$ space using a fast Fourier transform and dependent on $F(i,j)$;
   (c3) interpolating from $g(m,n)$ a line of Fourier components $g_\alpha(k)$ where $\alpha$ is a desired projection angle, k are inputs to $g_\alpha$ along the line of Fourier components passing through an origin in $(m,n)$ space and oriented perpendicular to the desired projection angle;
   (c4) performing a one-dimensional fast Fourier transform on $g_\alpha(k)$ to obtain a one-dimensional projection $p_\alpha(1)$;
   (c5) obtaining $p_\alpha(s)$ by one-dimensional interpolation from $p_\alpha(1)$ where $p_\alpha(s)$ is a line integral on a particular line at a location s in the desired projection angle $\alpha$;
   (d) using a Radon inversion process on $p_\alpha(s)$ to produce a reconstructed three-dimensional image of the object; and
   (e) displaying the reconstructed three-dimensional image of the object.

2. The method of imaging of claim 1 wherein steps (c3) through (c5) are repeated for various values of $\alpha$.

3. The method of imaging of claim 1 wherein steps (c3) and (c4) take into account at least all points in Radon space which are on or within the object.

4. The method of imaging of claim 3 further comprising causing movement of the source relative to the object and repeating at least steps (b) and (c) for different relative positions of the source.

5. The method of imaging of claim 1 wherein said cone beam energy is x-ray radiation from the source and further comprising the step of causing movement of the source relative to the object.

6. The method of imaging of claim 5 wherein g(m,n) is calculated by calculating where y'(ij) is the Y displacement of the point (ij) from C' and taking the 2D fast Fourier transform of g(m,n) being the Fourier transform of 7. The method of imaging of claim 6 wherein $p_\alpha(l)$ is the one-dimensional projection of G(i,j) in the desired projection angle 8. The method of imaging of claim 7 wherein steps (c3) and (c4) take into account all points in Radon space.

9. The method of imaging of claim 7 further comprising causing movement of the source relative to the object and repeating at least steps (b) and (c) for different relative positions of the source.

10. A method of imaging comprising the steps of:
   (a) using a computed tomography cone beam source to apply cone beam energy, dependent upon an object of interest, to an area detector;
   (b) detecting the cone beam energy to define a cone beam data image X(i,j) based upon the cone beam energy detected at points (i,j) on the area detector, each point (i,j) having a corresponding detector element;
   (c) determining the value of line integral J on the detector where $$J = \int \frac{|SC| X(t)}{(t - \Delta C)\sqrt{|SC|^2 + t^2}} dt$$

and where X(t) is cone beam data image at point t along a line of integration, SC' is the distance from a source S of cone beam energy to a rotation center C' on the detector, SC is the distance from the source S to a point C, wherein point C is the closest point to the origin on the line of integration and ΔC is the displacement of C' from C, the value of J being determined by the substeps of:
   (c1) calculating a modified image F(i,j)=X(i,j)/R(i,j) where R(i,j) is the distance from source S to point (i,j) on the area detector;
   (c2) calculating a two-dimensional Fourier transform g(m,n) in (m,n) space using a fast Fourier transform and dependent on F(i,j);
   (c3) interpolating from g(m,n) a line of Fourier components $g_\alpha(k)$ where α is a desired projection angle, k are inputs to $g_\alpha$ along the line of Fourier components passing through an origin in (m,n) space and oriented perpendicular to the desired projection angle;
   (c4) performing a one-dimensional fast Fourier transform on $g_\alpha(k)$ to obtain a one-dimensional projection $p_\alpha(l)$;
   (c5) obtaining $p_\alpha(s)$ by one-dimensional interpolation from $p_\alpha(l)$ where $p_\alpha(s)$ is a line integral on a particular line at a location s in the desired projection angle α; and
   (d) using a Radon inversion process on $p_\alpha(s)$ to produce a reconstructed three-dimensional image of the object.

11. The method of imaging of claim 10 wherein g(m,n) is calculated by calculating G(i,j)=F(k,j)/y'(i,j) where y'(i,j) is the Y displacement of point (ij) from C' and taking the 2D fast Fourier transform of G(i,j), g(m,n) being the Fourier transform of G(ij).

12. The method of imaging of claim 11 wherein $p_\alpha(l)$ is the one-dimensional projection of G(ij) in the desired projection angle α.

13. The method of imaging of claim 12 further comprising causing movement of the source relative to the object and repeating at least steps (b) and (c) for different relative positions of the source and further comprising displaying the image of the object.

14. An imaging system comprising:
   a computed tomography source of cone beam energy;
   an area detector for detecting cone beam energy from the source to provide a cone beam data image X(i,j) of an object of interest;
   a processor operably connected to the area detector to receive the image S(i,j) from the area detector, said processor having means for determining the value of line integral J on the detector where $$J = \int \frac{|SC| X(t)}{(t - \Delta C)\sqrt{|SC|^2 + t^2}} dt$$

and where X(t) is cone beam data image at point t along a line of integration, SC' is the distance from a source S of cone beam energy to a rotation center C' on the detector, SC is the distance from the source S to a point C, wherein point C is the closest point to the origin on the line of integration and ΔC is the displacement of C' from C, the value of J being determined by the substeps of:
   means for calculating a modified image F(i,j)=X(i,j)/R(i,j) where R(i,j) is the distance from source S to point (i,j) on the area detector;
   means for calculating a two-dimensional Fourier transform g(m,n) in (m,n) space using a fast Fourier transform and dependent on F(i,j);
   means for interpolating from g(m,n) a line of Fourier components $g_\alpha(k)$ where α is a desired projection angle, k are inputs to $g_\alpha$ along the line of Fourier components passing through an origin in (m,n) space and oriented perpendicular to the desired projection angle;
   means for performing a one-dimensional fast Fourier transform on $g_\alpha(k)$ to obtain a one-dimensional projection $p_\alpha(l)$;
   means for obtaining $p_\alpha(s)$ by one-dimensional interpolation from $p_\alpha(l)$ where $p_\alpha(s)$ is a line integral on a particular line at a location s in the desired projection angle α; and
   means for reconstructing a three-dimensional image of the object from $p_\alpha(S)$ using a Radon inversion process; and
   a display operably connected to said processor to display the reconstructed three-dimensional image of the object.

15. The imaging system of claim 14 wherein said means for calculating g(m,n) includes means for calculating G(i,j)=F(i,j)/y'(i,j) where y'(ij) is the y displacement of the point (ij) from C' and means for taking the 2D fast Fourier transform of G(ij), g(m,n) being the Fourier transform of G(ij).

16. The imaging system of claim 15 wherein $p_\alpha(l)$ is the one-dimensional projection of G(ij) in the desired projection angle α.

17. The imaging system of claim 16 wherein the source provides x-ray energy.

18. The imaging system of claim 14 wherein the source provides x-ray energy.

* * * * *